United States Patent
Tracy et al.

[11] Patent Number: 5,383,589
[45] Date of Patent: Jan. 24, 1995

[54] MODULAR CARRIER SYSTEM FOR ELONGATE ARTICLES

[76] Inventors: Keith P. Tracy, 10710 N. Magnolia Dr., Mequon, Wis. 53092; William E. Chase, 1038 Ocontobanks, Colgate, Wis. 53017

[21] Appl. No.: 24,645

[22] Filed: Mar. 1, 1993

[51] Int. Cl.⁶ .............................................. B60R 9/00
[52] U.S. Cl. ........................................ 224/324; 224/309; 224/314; 224/325
[58] Field of Search ............... 224/309, 314, 322, 324, 224/325, 326, 329, 330, 331, 917; 248/683, 205.5, 205.6, 205.7, 205.8, 205.9, 206.1, 206.2, 206.3, 309.3; 211/70.5, 60.1; 403/321, 322, 324; 296/37.1, 37.7; 24/68 CD X, 68 F, 68 E, 71.2 X, 71.3, 71 TD

[56] References Cited

U.S. PATENT DOCUMENTS

| | | | |
|---|---|---|---|
| Re. 27,170 | 6/1966 | Porter | 224/917 X |
| D. 299,913 | 2/1989 | Arvidsson | D12/157 |
| D. 300,914 | 5/1989 | Arvidsson | D12/157 |
| D. 302,000 | 7/1989 | Arvidsson | D12/157 |
| 2,434,387 | 1/1948 | Brandt | 224/917 X |
| 2,589,772 | 3/1952 | Carter et al. | 224/325 |
| 2,596,860 | 5/1952 | McCrory et al. | 224/331 X |
| 2,720,350 | 10/1955 | Felton | 224/917 X |
| 3,091,827 | 6/1963 | Rardrup | 24/68 F |
| 3,222,745 | 12/1965 | Palmleaf et al. | 24/68 F |
| 3,836,058 | 9/1974 | Penniman et al. | 224/315 |
| 3,858,279 | 1/1975 | Brattstrom | 24/68 F |
| 3,897,895 | 8/1975 | Read | 234/917 X |
| 4,278,192 | 7/1981 | Sazegar | 224/325 |
| 4,372,470 | 2/1983 | Dallaire | 224/917 X |
| 4,373,234 | 2/1983 | Boden | 24/191 |
| 4,396,138 | 8/1983 | Kirschner | 224/917 X |
| 4,449,656 | 5/1984 | Woudon | 224/320 |
| 4,479,674 | 10/1984 | Nordmeyer | 294/147 |
| 4,524,893 | 6/1985 | Cole | 224/319 |
| 4,688,706 | 8/1987 | Thulin | 224/329 |
| 4,696,447 | 9/1987 | Strucker | 248/206.3 |
| 4,720,031 | 1/1988 | Zimmerman | 224/917 X |
| 4,836,482 | 6/1989 | Sokol | 248/206.3 |
| 4,842,315 | 6/1989 | Nordmeyer | 294/147 |
| 4,877,169 | 10/1989 | Grim | 224/331 |
| 4,995,538 | 2/1991 | Marengo | 224/315 X |
| 4,997,116 | 3/1991 | Grim | 224/42.033 |
| 5,016,850 | 5/1991 | Plahn | 248/206.3 |
| 5,038,988 | 8/1991 | Thulin | 224/322 |
| 5,076,479 | 12/1991 | Davison | 224/324 |
| 5,104,020 | 4/1992 | Arvidsson | 224/331 |
| 5,115,955 | 5/1992 | Dallaire et al. | 224/315 X |

Primary Examiner—Henry J. Recla
Assistant Examiner—David J. Walczak
Attorney, Agent, or Firm—Reinhart, Boerner, Van Deuren, Norris & Rieselbach

[57] ABSTRACT

A carrier system for carrying elongate articles, such as skis and poles, on the exterior of an automobile includes a pair of separate, compact base members. Each base member includes three suction cups arranged in a triangular, three-point configuration for engaging the exterior of the automobile and further includes a flexible strap extending from side to side between the rain gutters of the vehicle. Each strap includes a cam-like tensioning member that, when rotated, significantly increases the tension in each strap. The base members are mounted one ahead of the other on the roof of the vehicle. A plurality of clips or other article-engaging members are detachably mounted to the base members for engaging the articles to be carried. Different types of article engaging members are provided for carrying different types of loads. In one embodiment, each base member includes a pair of built-in load stops for carrying loads therebetween.

10 Claims, 6 Drawing Sheets

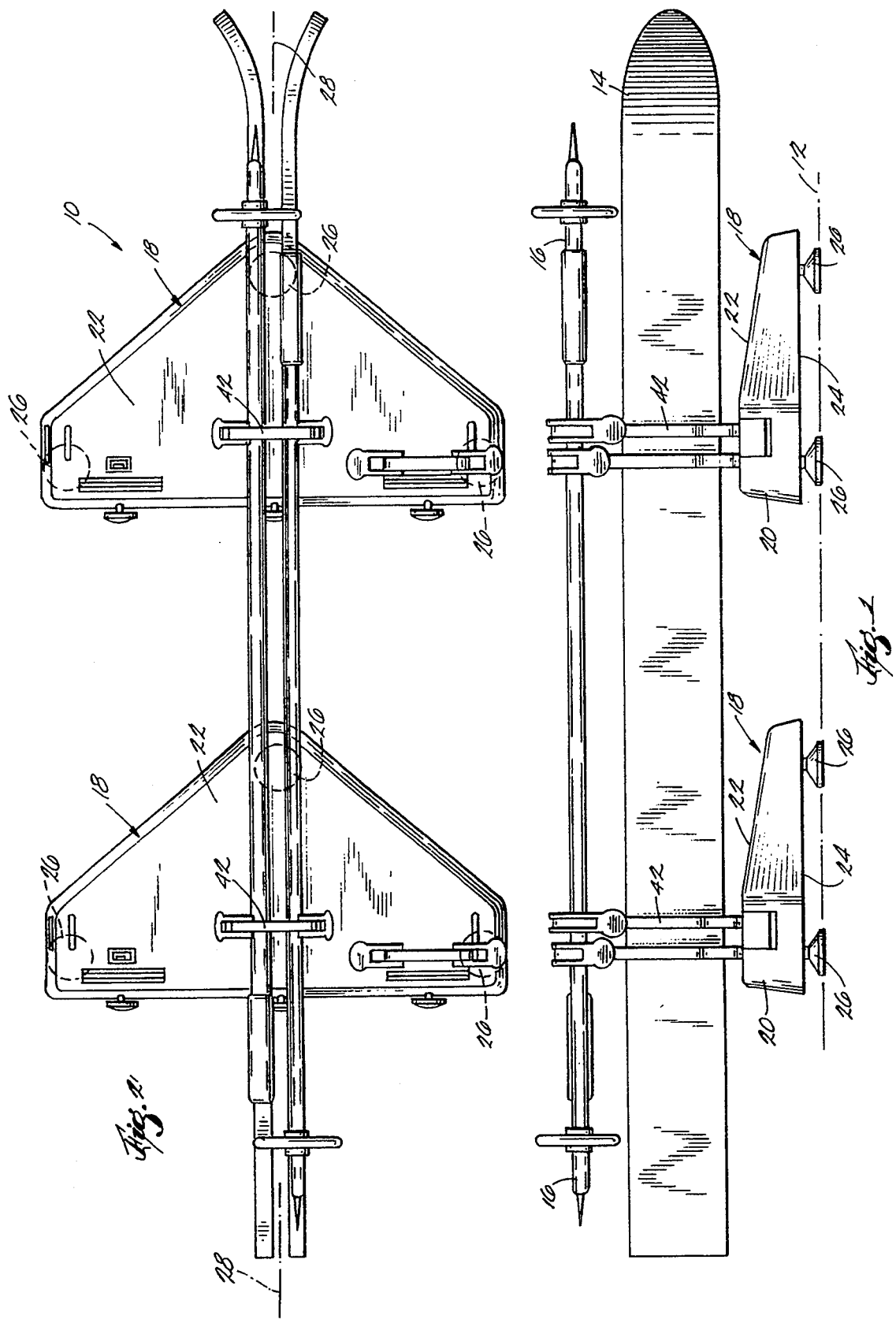

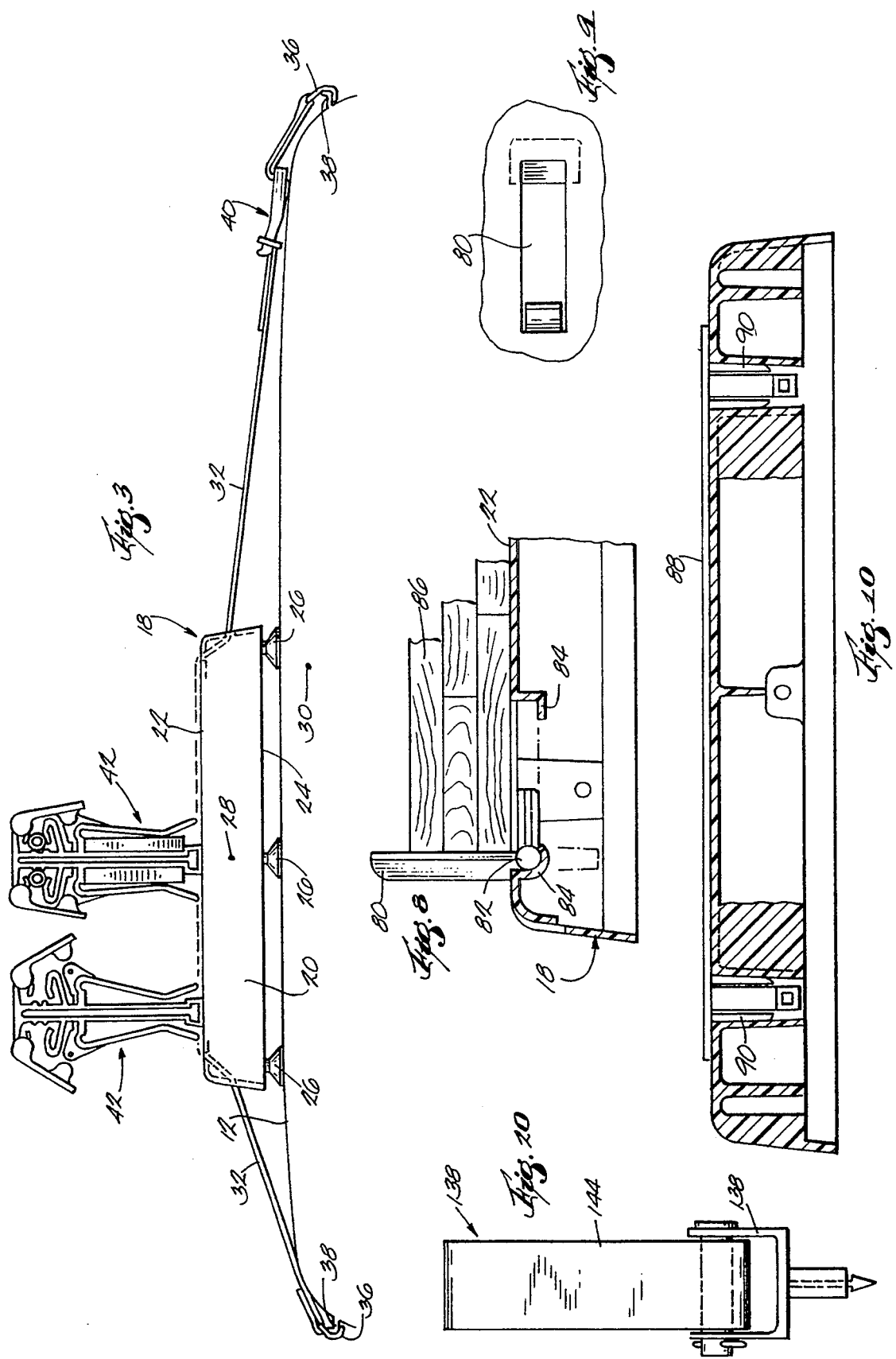

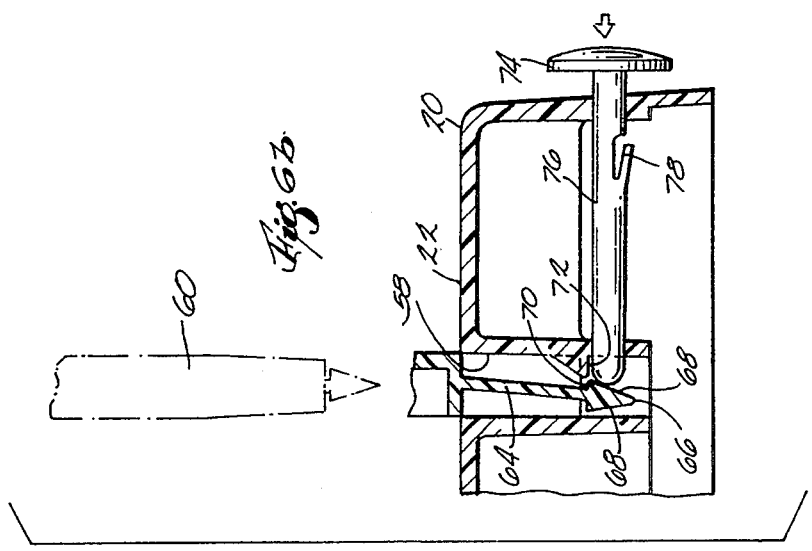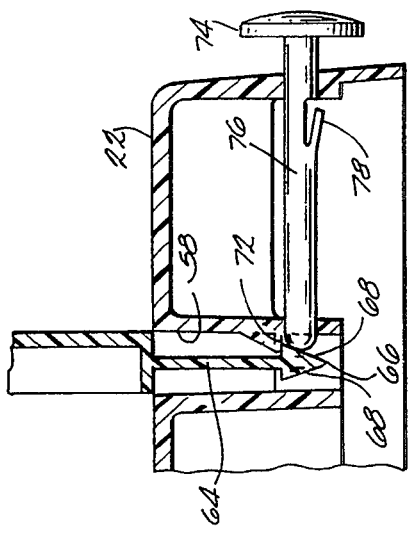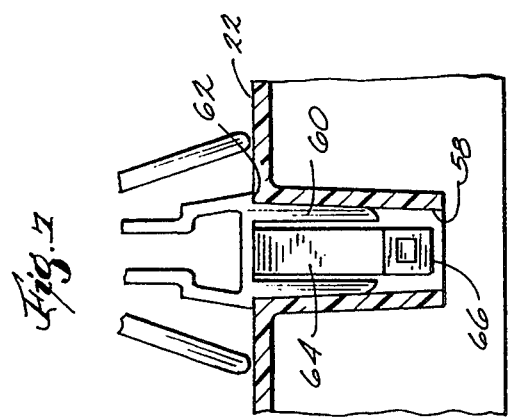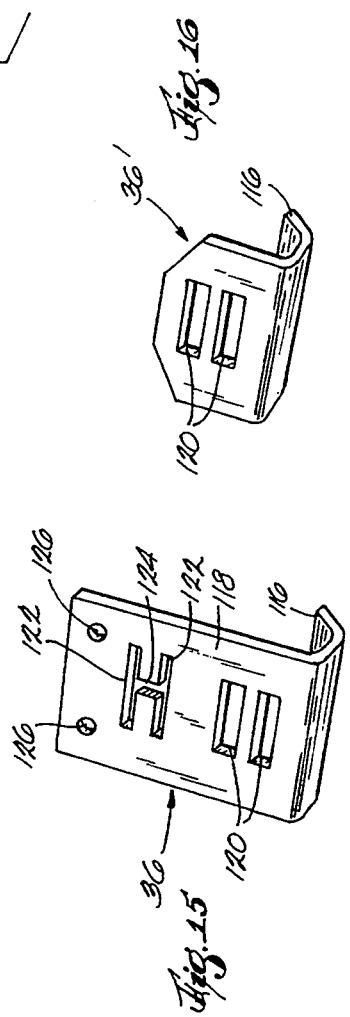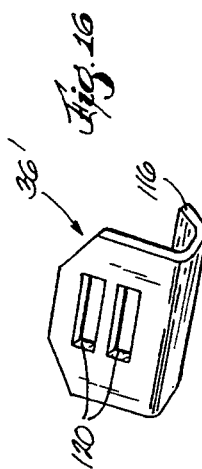

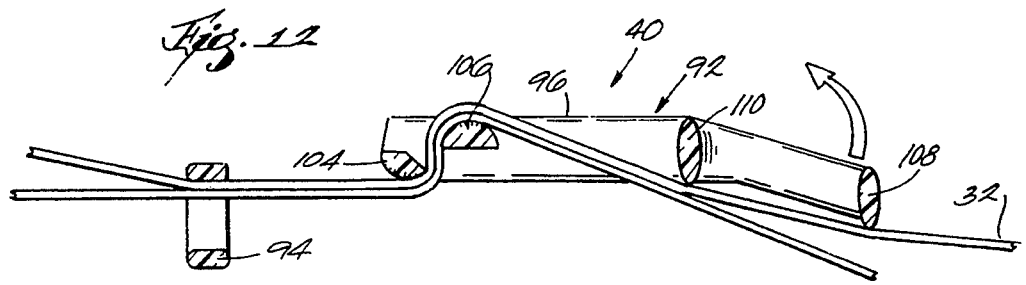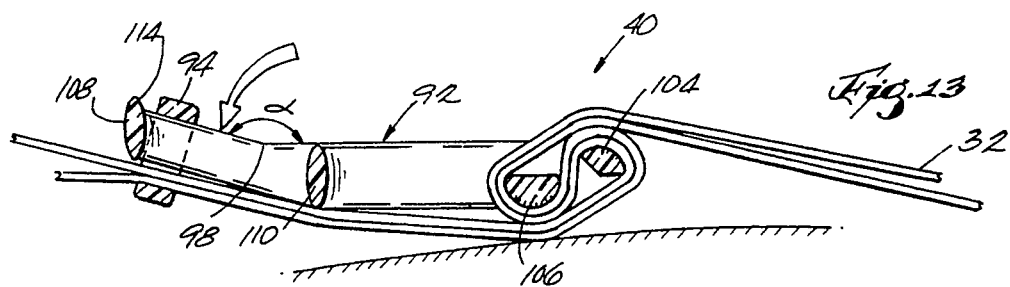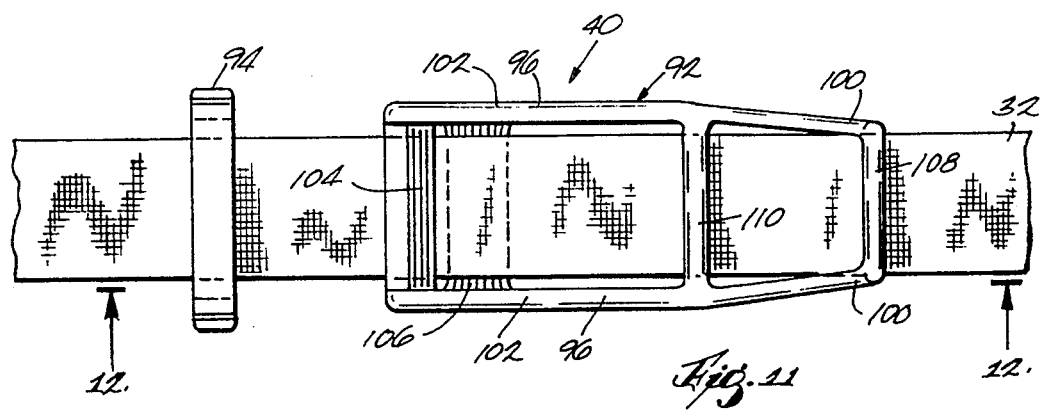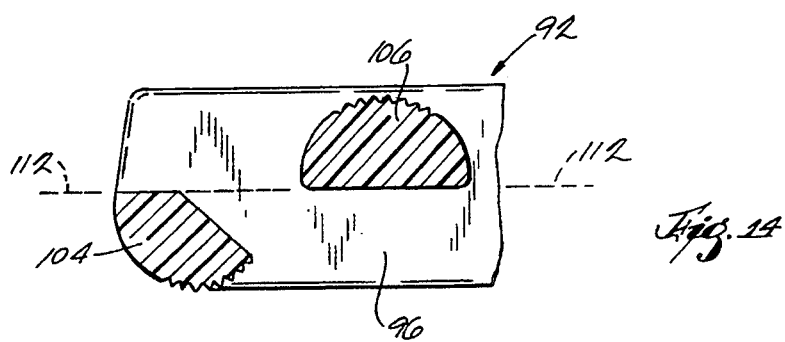

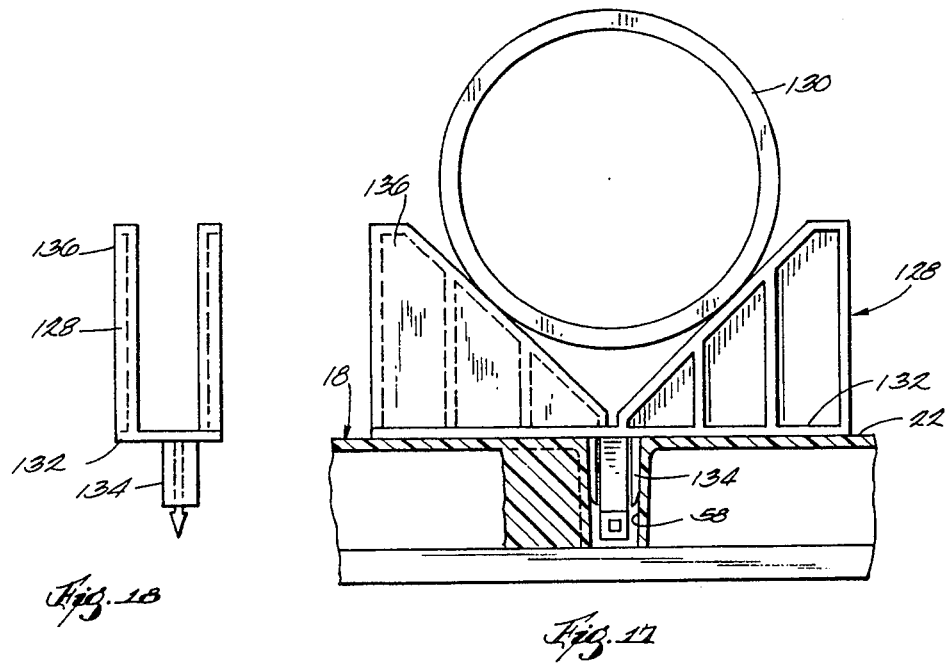
Fig. 18
Fig. 17
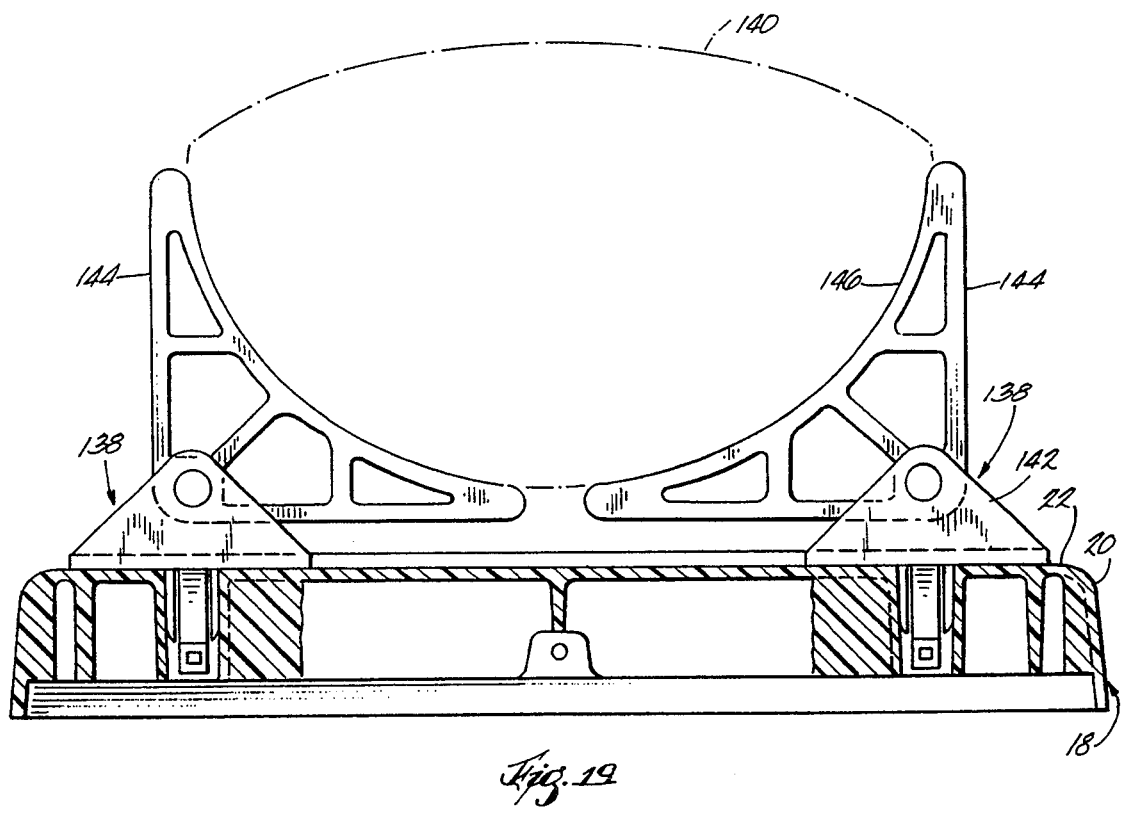
Fig. 19

MODULAR CARRIER SYSTEM FOR ELONGATE ARTICLES

BACKGROUND OF THE INVENTION

This invention relates generally to article carriers for motor vehicles and, more particularly, to removable carriers for ski equipment and the like.

At best, skis and poles are awkward and cumbersome to transport in the trunk or passenger compartment of a car. Accordingly, a variety of attachments have been developed for carrying skis and poles on the exterior of a car. Such systems range from relatively simple hooks that clip onto the side windows of the car to elaborate brackets that are more or less permanently mounted on the roof of the car. Each system is a compromise among competing considerations of cost, security, simplicity, versatility and convenience.

At the simple end of the spectrum, some systems, such as simple window hooks, provide simplicity and economy. Such systems, however, can lack security and durability. A failure in such a system can result in loss of or damage to valuable ski equipment and might even result in personal injury depending on the nature and circumstances of the failure. At highway speeds, the security and reliability of the system are of significant concern.

At the other end of the spectrum, large, heavy-duty, permanent or semi-permanent ski carriers provide security, but often at considerable cost. Furthermore, such systems can require that holes be drilled in the vehicle. In the case of permanent or semi-permanent installations, such systems can interfere with the ability to carry other loads on the vehicle and can detract from the appearance of the vehicle.

In view of the foregoing, a need exists for a carrier system that is safe and reliable as well as convenient and economical.

SUMMARY OF THE INVENTION

The invention provides a carder system for carrying elongate members on a motor vehicle. The system includes a pair of base members, each of which includes three contact surfaces configured to engage the motor vehicle at three triangularly disposed points. A flexible strap extends from each of the base members. Each flexible strap engages opposite sides of the vehicle to provide lateral support to each of the base members when the base members are in place on the vehicle. An article-engaging member is carried on each of the base members for engaging the elongate members to be carried on the vehicle.

In one embodiment, the article-engaging members are detachably mounted to the base members.

In one embodiment, each of the flexible straps includes a tensioning member for tensioning the straps when the base members are in place on the motor vehicle and the straps engage opposite sides of the vehicle.

In one embodiment, a plurality of article-engaging members are provided for engaging and supporting a variety of different types of elongate members.

It is an object of the present invention to provide a new and improved system for carrying elongate objects on the exterior of a motor vehicle.

It is another object of the present invention to provide a new and improved carrier system that securely and reliably carries elongate objects on the exterior of a vehicle.

It is still another object of the present invention to provide a carrier system that is easily and conveniently mounted onto and removed from a vehicle.

It is still another object of the present invention to provide a carrier system that can be economically manufactured.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a side elevation view of a carrier system embodying various features of the invention.

FIG. 2 is a top plan view of the carrier system shown in FIG. 1.

FIG. 3 is a front elevation view of a carrier system embodying various features of the invention showing the carrier system in place on the roof of an automobile.

FIGS. 6a and 6b are sectional views of a locking mechanism for removably mounting article-engaging members, such as the ski clips shown in FIG. 5, to the base member, useful in understanding the operation thereof.

FIG. 7 is another sectional view showing the engagement of the article-engaging members, such as the ski clip shown in FIG. 5, with the base FIG. 8 is a fragmentary sectional view of a base member showing a built-in load stop member in a raised or use position.

FIG. 9 is a fragmentary top view of the stop member shown in FIG. 8 showing the load stop member in a lowered or storage position.

FIG. 10 is a sectional view of a base member showing an alternate form of article-engaging member mounted thereon.

FIG. 11 is a top plan view of a tensioning system useful in conjunction with the carrier system.

FIG. 12 is a cross sectional view of the tensioning system shown in FIG. 11 taken along line 12—12 thereof showing the tensioning system in a non-tensioned or release position.

FIG. 13 is a view, similar to FIG. 12, showing the tensioning system in a tensioned position.

FIG. 14 is an enlarged, fragmentary sectional view of a tensioning member showing the cooperating cam surfaces thereof.

FIG. 15 is a perspective view of a tension hook useful in conjunction with the carrier system.

FIG. 16 is a perspective view of an alternate embodiment tension hook useful in conjunction with the carrier system.

FIG. 17 is fragmentary front view of an alternate form of article-engaging member useful for carrying cylindrical objects such as pipes.

FIG. 18 is a side elevation view of the article-engaging member shown in FIG. 17.

FIG. 19 is a fragmentary front view of still another article-engaging member for carrying a specialty item such as a kayak.

FIG. 20 is a side elevation view of the article-engaging member shown in FIG. 19.

DESCRIPTION OF THE PREFERRED EMBODIMENT

Figure 4:
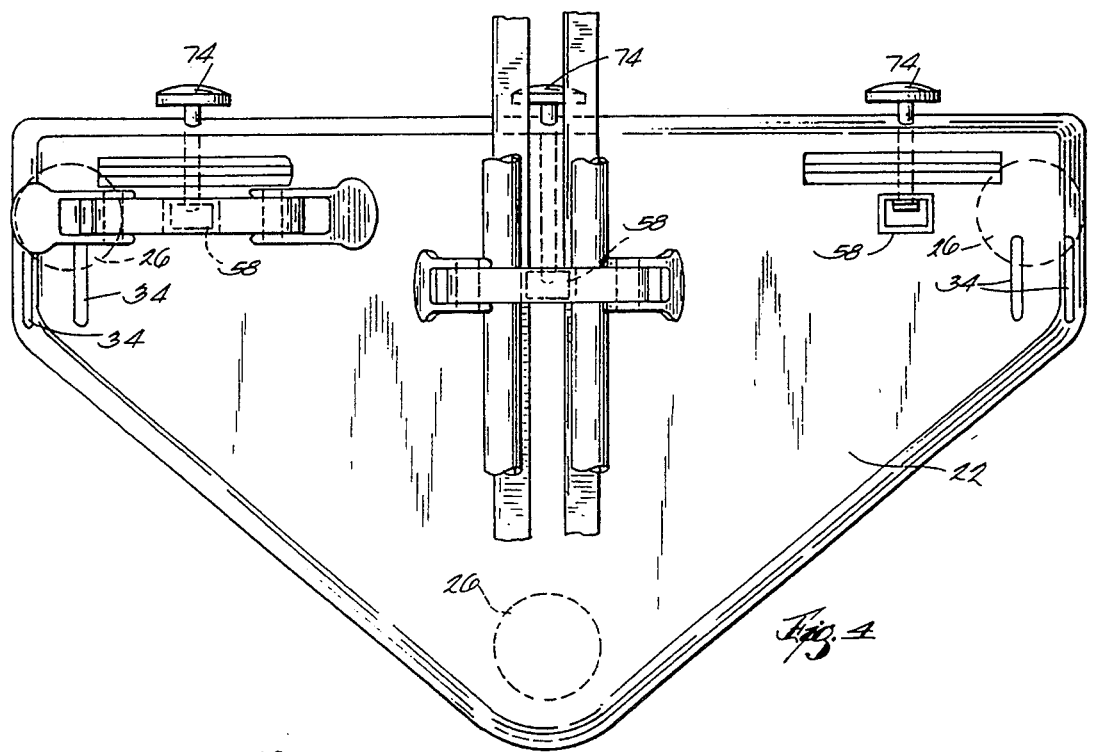
FIG. 4 is a top plan view of a base member constructed in accordance with various aspects of the invention further showing the construction and operation thereof.

Referring to the drawings and, in particular to FIGS. 1, 2 and 3, a modular carrier system 10 embodying various features of the invention is illustrated. In the illustrated embodiment, the modular carrier system 10 is shown mounted on the roof 12 of an automobile and is further shown carrying elongate objects in the form of one or two pairs of skis 14 and ski poles 16. It will be appreciated, however, that other forms of elongate objects can be carried.

As shown, the modular carrier system 10 includes two base members 18 that are preferably (although they need not be) substantially identical. Each base member 18 is preferably formed of a durable, rigid, injection molded plastic and includes a generally triangular housing 20 having an upper surface 22 and a lower surface 24. Contact surfaces in the form of three suctions cups 26 are mounted to the lower surface 24 of each base member housing 20 in a generally triangular pattern as shown. Preferably, the suction cups 26 threadedly engage the base member housing 20 so that the height of each suction cup 26 relative to the underside 24 of each base member housing 20 can be adjusted.

In use, the base members 18 are positioned on the roof 12 of the automobile, one behind the other, and are spaced from each other along an axis 28 that is generally parallel to the longitudinal axis 30 of the vehicle. The suction cups 26 on the lower surface 24 of each base member housing 20 help secure the base members 18 to the roof 12 (or hatchback or trunklid) of the automobile. In addition, each base member 18 includes a tensioning strap 32 that extends from side to side across the roof 12 of the automobile as best seen in FIG. 3. Preferably, each base member 18 includes a single tensioning strap 32 that is threaded through slots 34 formed in the sides of the base member housing 20 to pass over the upper surface 22 of the base member 18.

Each tensioning strap 32 preferably comprises a flexible, low-stretch synthetic web or similar flexible belt-like member. A tension hook 36, which preferably comprises a metal stamping, is attached to each end of the strap 32. Each tension hook 36 is arranged to hook onto the lip of the roof or to the rain gutter 38 of the vehicle to anchor the ends of the strap 32. Tensioning means are provided for tensioning the strap 32 to help hold the base member 18 securely in place on the exterior of the vehicle. In the illustrated embodiment, such tensioning means take the form of a tensioning system 40 that is described in greater detail below and in the copending application of Tracy, et al., Ser. No. 08/024,514, entitled "Tensioning System For Flexible Straps" filed concurrently herewith.

The modular carrier system 10 further includes a plurality of article-engaging members for engaging and retaining the elongate members to be carried by the system. In the embodiment illustrated in FIGS. 1–10, the article-engaging members comprise ski clips 42 that are configured to hold a pair of skis 14 and a pair of poles 16. Means are provided for detachably securing the article-engaging members to the base members 18. This permits different types of article-engaging members to be used with the same base members 18 to enable the system 10 to carry a variety of loads. In addition, and particularly in the case of the skis 14 and poles 16 illustrated, such detachability allows the clipped-together skis 14 and poles 16 to be handled as a single unitary package when detached from the base members 18.

Figure 5:
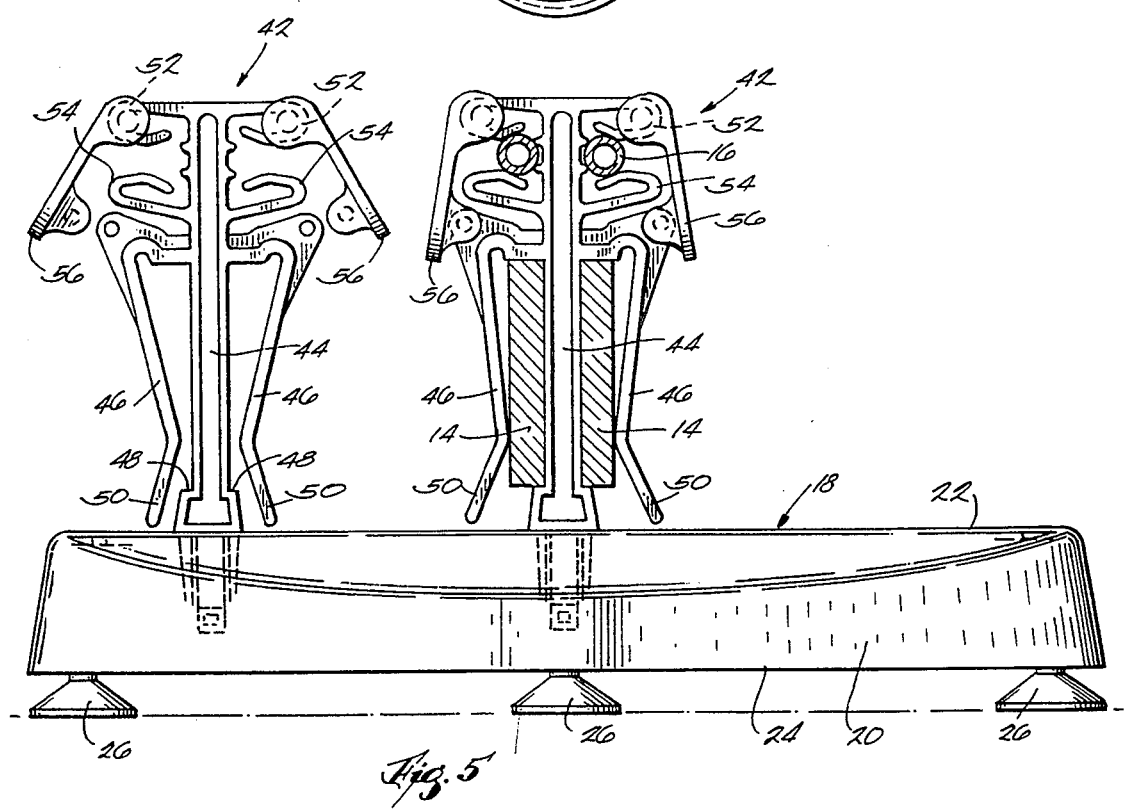
FIG. 5 is a front elevation view of a base member constructed in accordance with various aspects of the invention useful in understanding the construction and function of a ski clip that is removably mountable onto the base member.

As best seen in FIGS. 1, 3 and 5, the ski clips 42 each include a substantially vertical central portion 44 and a pair of opposed, inwardly biased side portions 46. The skis 14 are positioned between the side portions 46 and the central portion 44 and are retained by the inward bias of the side portions 46. A shelf 48 formed on each side of the central portion 44 adjacent the lower end thereof helps support the skis 14. The lowermost ends 50 of the side portions 46 are outwardly flared to facilitate insertion of the skis 14.

The upper end of each ski clip includes on either side of the central vertical portion 44 a pair of opposed, upper and lower inwardly turned flanges 52, 54 that are arranged to receive and retain a ski pole 16 therebetween. The ski poles 16 are held in position in part by the resiliency of the flanges 52, 54. In addition, pivotal clips 56 on either side of the upper end of the ski clip 42 are located outwardly of the ski poles 16 to help ensure that the ski poles 16 do not become disengaged from the ski clip 42 during transport.

The mechanism by which the article-engaging members are detachably secured to the base members 18 is best understood by reference to FIGS. 4–7. As shown, each base member 18 includes three substantially rectangular apertures or sockets 58 formed in the upper surface 22 thereof. Each socket 58 is dimensioned to receive a complimentary-shaped projection or pin 60 formed at the lowermost end of each article-engaging member. A shoulder 62 formed where each projection 60 joins the remainder of the article-engaging member engages the upper surface 22 of the base member housing 20 to support the article-engaging member thereon and to limit the downward movement of the article-engaging member into the base member 18.

As illustrated, the projection 60 on each article-engaging member includes a central, deflectable tab 64 that terminates, at its lowermost end, in a wedge-shaped point 66. A ramped surface 68 is thus formed on either side of the wedge-shaped point 66, and a ledge 70 is formed where the uppermost end of the wedge 66 joins the remainder of the tab 64. A similar ledge 72 formed in the interior of the socket 58 in the base member 18 is positioned to engage the ledge 70 of the tab 64 to secure the article engaging member to the base member 18 in the manner best seen in FIG. 6a. The upper end of the ledge 72 in the socket 58 is ramped as shown to automatically deflect the tab 64 of the article engaging member to the side during installation so that the article-engaging member can be installed onto the base member 18 merely by pushing the article-engaging member downwardly into the socket 58.

To remove the article engaging member from the base member 18, the base member 18 includes a release button 74 associated with each of the sockets 58. As best seen in FIGS. 6a and 6b, each release button 74 includes an elongate horizontal shaft 76 extending through the base member housing and positioned so that the inward end thereof bears against the ramped outer surface 68 of the tab 64. When the release button 74 is pressed inwardly as shown in FIG. 6b, the inner end of the shaft 76 deflects the lower end of the tab 64 to the side to disengage the interlocking ledges 70, 72 and thereby permit the article engaging member to be withdrawn from the base member 18. A deflectable tab 78 formed on the shaft 76 of the release button 74 immediately inwardly of the outer wall of the base member housing 20 prevents unintended withdrawal of the release button 74 from the base member housing 20.

Preferably, the article-engaging members (the ski clips 42), the pivotal clips 56 and the release buttons 74 are each formed of a molded, resilient plastic that can be repeatedly deformed by externally applied forces and that tends to return to its original shape after such forces are removed.

In accordance with one aspect of the invention, the modular carrier system 10 is capable of carrying a variety of elongate members other than skis and poles. In one embodiment, each of the base members 18 includes an opposed pair of flip-up load supports or stops 80 pivotally mounted to the base member housing. As best seen in FIGS. 8 and 9, each load stop is pivotally movable between a raised or use position (FIG. 8), wherein the load stop projects vertically upwardly from the upper surface 22 of the base member 18, and a lowered or storage position (FIG. 9), wherein the load stop 80 is substantially coplanar with the upper surface 22 of the base member 18. As shown in FIG. 8, one end of each load stop 80 includes a substantially cylindrical pin 82 that rides in a complementary socket 84 formed in the base member housing 20, while the other end of the load stop 80 is dimensioned and positioned to rest against a right-angled ledge 84 formed in the base member housing 20 when the load stop 80 is in the lowered or stored position. As further illustrated in FIG. 8, when the load stops 80 are raised, elongate articles, such as a plurality of boards 86, can be carried between the raised load stops 80 of the base members 18 mounted on the vehicle. When used in this manner, the ski clips 42 are removed and are preferably replaced with an antiskid member 88 that resists sliding movement of the boards or other loads relative to the base member.

As best seen in FIG. 10, the antiskid member 88 comprises a substantially elongate strip having a pair of downwardly projecting pins or projections 90 adjacent the ends thereof. The projections 90, which are substantially similar to the projections 60 formed at the base of the ski clips 42 (FIGS. 5-7), are received in the sockets 58 and are detachably secured to the base member 18 substantially in the same manner as the ski clips 42. Preferably, the antiskid member 88 is molded of a resilient plastic and has a closed cell foam strip applied to resist sliding movement of the load. In addition, the upper surface of the antiskid member can be serrated or otherwise shaped to resist sliding movement of the load.

The tensioning system 40 for tensioning the straps 32, is shown in detail in FIGS. 11-14. The tensioning system 40 generally includes an elongate tensioning member 92 that can be manipulated by a user to place the strap 32 under tension. The system 40 further includes a keeper or retainer 94 that can thereafter be used to hold the tensioning member 92 in position and thereby keep the strap 32 under tension.

The tensioning member 92 comprises an elongate structure having two substantially identical side portions 96. The side portions 96 are substantially parallel for about two-thirds of their length and then taper gently inwardly toward each other over the remaining third as best seen in FIG. 1. As best seen in FIGS. 12 and 13, the side members 96 preferably have a dog-leg form or shape so as to form an obtuse angle $\alpha$ having a vertex 98 generally located where the tapered portions of the sides 96 meet the parallel portions of the sides. Preferably, the spacing between the sides 96 is such that the closest distance between the inwardly tapered ends 100 of the sides 96 is substantially equal to the width of the strap 32 while the distance between the parallel portions 102 of the sides 96 is slightly greater than the width of the strap 32.

As further illustrated, a plurality of cross-members 104, 106, 108, 110 extend perpendicularly between the sides 96 of the tensioning member. Two of the cross-members 104, 106 are located adjacent the ends of the parallel portions 102 of the sides 96. A third cross-member 108 is located at the ends 100 of the tapered portions of the sides 96, while a forth cross-member 110 extends between the sides 96 substantially at the juncture of the tapered and parallel portions thereof. Preferably, the tensioning member 92 is molded as a single, unitary member from a durable, rigid plastic.

The two cross-members 104, 106 at the ends of the tensioning member 92 are preferably shaped and dimensioned as best seen in FIG. 14. The outermost cross-member 104 is positioned generally below the mid-line 112 of the side 96 and has an arcuate outer surface. The second cross-member 106 is positioned generally above the mid-line 112 of the side 96 and is spaced inwardly from the end of the side 96 so as not to overlap the first cross-member 104. In cross-section, the second cross-member 106 has a substantially semi-circular shape while the cross-section of the first cross-member 104 is somewhat less than semi-circular.

The third and forth cross-members 108, 100 are of substantially elliptical cross-section as best seen in FIGS. 12 and 13. The third cross-member 108 is of somewhat greater width than the side members 96 so as to form an upwardly projecting lip 114 as best seen in FIG. 13. The keeper or retainer 94, which is also preferably formed of a molded, durable, rigid plastic, comprises a substantially rectangular loop dimensioned to slide over the tapered end 100 of the tensioning member 92.

In use, the flexible strap 32 is threaded through the retainer 94, under the first cross-member 104, over the second cross-member 106 and under the third and forth cross-members 108, 110 as shown in FIG. 12. To place the strap 32 under tension the strap is threaded through the bottom slot of the tension hook and passed through the tensioning member parallel to the first strap entry, and the tapered end 100 of the tensioning member 92 is rotated in a counter-clockwise direction (as viewed in FIG. 12) through substantially 180° of arc to the position shown in FIG. 13. The interrelationship of the first and second cross-members 104, 106 has a camming effect that shortens the effective length of the strap 32 and thereby substantially increases the tension in the strap 32. The rounded outer surface of the first cross-member 104 serves as a fulcrum around which the entire length of the tensioning member 92 pivots. The length of the tensioning member 92 thereby serves as a lever to provide a mechanical advantage that enables the tension in the strap 32 to be substantially greater than the force applied to the end of the tensioning member 92. Once the tensioning member 92 has been fully rotated to the tensioned position shown in FIG. 13, the retainer 94 is slipped over the end of the tensioning member 92 to hold the tensioning member 92 in place. The lip 114 provided by the cross-member together with the natural tendency of the tensioning member 92 to return to the release position, helps hold the retainer 94 in place to avoid unintended release of the tensioning member 92. To release tension in the strap 32, the retainer 94 is slipped over the end of the tensioning member 92 and the tensioning member 92 is rotated to the release position shown in FIG. 12.

As best seen in FIG. 14, the outer surfaces of the first and second cross-members 104, 106 can be serrated or otherwise roughened to the increase the friction between the cross-members 104, 106 and the strap to avoid slippage.

As will be appreciated by reference to FIG. 13, when the tensioning member 92 is in the tensioned position, the strap 32 is at all times and at all points positioned between the tensioning member and any underlying surface. The strap 32 thus serves as a buffer between the tensioning member 92 and the roof 12 of the automobile to minimize or prevent marring the automobile's finish. It will also be appreciated that the dog-leg configuration of the tensioning member 92 helps hold the tensioning strap 32 up away from the roof 12 so that contact between the strap 32 and the roof 12 occurs substantially at only one point.

One preferred form of tension clip 36 is shown in FIG. 15. The clip 36 is preferably formed of stamped metal or a molded, rigid, durable plastic and includes a hook-like bend 116 at one end for engaging the rain gutter 38, hatchback, trunk lid or roof lip of the automobile. The hook 36 further includes a substantially planar body portion that includes a pair of parallel, horizontal slots 120 formed therethrough. The strap 32 is threaded through the slots 120 to secure the tension hook 36 to the strap 32. An additional pair of horizontal slots 122 having a central perpendicular cut 124 formed therebetween are provided for adding an additional strap if necessary or desired. Similarly, a pair of apertures 126 adjacent the upper corners of the tension hook 36 permit additional straps or supports, such as bungee cords, to be attached to the tension hook 36 to provide still greater security.

An alternative embodiment tension hook 36' is shown in FIG. 16. In this embodiment, the tension hook 36' is smaller, more economically manufactured and does not include the additional slots 122 or apertures 126.

Additional forms of article-engaging members are shown in FIGS. 17–20. In FIGS. 17 and 18, an article-engaging member 128 that is particularly well adapted for carrying cylindrical objects, such as pipes 130, is illustrated. The article-engaging member 128 includes a flat base 132 arranged to rest on the upper surface 22 of the base member housing 20 and further includes a projection 134 that is received and detachably secured within one of the base member housing sockets 58. A pair of opposed, spaced-apart, V-shaped plates 136 project upwardly from the base to form a notch within which the pipe can be carried. In such an application, the tension strap 32 can be threaded over the pipe 130 before tensioning to help hold the pipe securely within the notch.

The article-engaging members 138 shown in FIGS. 19 and 20 are arranged to carry a larger curved object, such as a kayak 140. In this embodiment, each article-engaging member 138 includes a base portion 142 that rests on the upper surface of the base member housing 20 and is detachably secured to the base member 18 by means of the same type of projection and socket structure shown in FIGS. 6 and 7. A support element 144 having an arcuate surface 146 for engaging the article to be transported is pivotally secured to the base 142. This allows the support 144 to self-adjust to the shape and position of the load 140. Once again, the tension strap 32 can be threaded over the load 140 before tensioning to help secure the load in place.

The modular carrier system herein shown and described provides numerous advantages. First, the individual modules, such as the base members and the article-engaging members, can be economically manufactured from molded plastic materials. Furthermore, the individual components are relatively small, which makes them easy to install, remove and store. The three point configuration of the suction cups on the bottom of each base member provides substantial security and support, particularly during braking when the inertia of the load tends to force the base members forwardly. The detachable article-engaging members, and the variety of article-engaging members that can be used with the system increase versatility and permit a variety of articles, besides skis and poles, to be carried by the system. Finally, the detachable ski clips herein shown and described enable the clipped-together skis and poles to be easily handled as a single unitary package. It will be appreciated that the precise shapes, materials and configuration herein shown and described can be modified to suit particular applications.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A carrier system mountable on a motor vehicle for carrying elongate members on the motor vehicle, said system comprising:

a pair of base members, each of said base members including three contact surfaces configured to engage the motor vehicle at three triangularly disposed points;

a flexible strap extending from each of said base members configured to engage opposite sides of the vehicle to provide lateral support to each of said base members when said base members are in place on the motor vehicle;

an article-engaging member carded on each of said base members for engaging the elongate members to be carded on the exterior of the motor vehicle; and a tensioning system for tensioning said flexible strap, said tensioning system comprising:

an elongate tensioning member having a pair of laterally displaced substantially parallel cooperating cross members around and between which said flexible strap can be threaded and further including an extended portion by means of which the tensioning member can be rotated to a tensioned position to shorten the effective length of said strap and thereby increase the tension in said strap; and a retainer detachably coupled to the tensioning member for securing the tensioning member in the tensioned position.

2. A carder system as defined in claim 1 wherein said carrier system further includes means for detachably securing said article-engaging members to said base members.

3. A carrier system as defined in claim 2 wherein each of said base members includes a socket and each of said article engaging members includes a projection releasably securable in said socket.

4. A carrier system as defined in claim 1 wherein said contact surfaces comprise suction cups.

5. A carrier system as defined in claim 1 wherein each of said base members includes a load stop movable between a use position wherein said load stop projects upwardly from said base member and a storage position wherein said load stop is substantially coplanar with said base member.

6. A carrier system as defined in claim 1 wherein said system includes a plurality of said article-engaging members for engaging and carrying different types of elongate members on the base members.

7. A carrier system mountable on a motor vehicle for carrying elongate members on the motor vehicle, said system comprising:

a pair of base members, each of said base members including a generally triangular housing having three contact surfaces carried thereon configured to engage the motor vehicle at three triangularly disposed points;

each of said base members including a flexible strap configured to engage opposite sides of the vehicle to provide lateral support to said base member when said base member is in place on the motor vehicle;

an article-engaging member carded on each of said base members for engaging the elongate members to be carded on the motor vehicle;

tensioning means for tensioning each of said flexible straps when said base members are mounted on the motor vehicle and said flexible straps engage opposite sides of the motor vehicle; and means for detachably securing said article-engaging members to said base members;

each of said base members including a socket; and each of said article engaging members including a projection releasably securable in said socket.

8. A carrier system mountable on a motor vehicle for carrying elongate members on the motor vehicle, said system comprising:

a pair of base members, each of said base members including a generally triangular housing having three contact surfaces carried thereon configured to engage the motor vehicle at three triangularly disposed points;

each of said base members including a flexible strap configured to engage opposite sides of the vehicle to provide lateral support to said base member when said base member is in place on the motor vehicle; and an article-engaging member carried on each of said base members for engaging the elongate members to be carded on the motor vehicle;

each of said base members including a load stop movable between a use position wherein said load stop projects upwardly from said base member and a storage position wherein said load stop is substantially coplanar with said base member.

9. A carrier system mountable on a motor vehicle for carrying elongate members on the motor vehicle, said system comprising:

a pair of base members, each of said base members including a generally triangular housing having three contact surfaces carded thereon configured to engage the motor vehicle at three triangularly disposed points;

each of said base members including a flexible strap configured to engage opposite sides of the vehicle to provide lateral support to said base member when said base member is in place on the motor vehicle; and a plurality of article-engaging members mountable on said base members for engaging and carrying different types of elongate members on the base members.

10. A carder system mountable on a motor vehicle for carrying elongate members on the motor vehicle, said system comprising:

a pair of base members, each of said base members including a generally triangular housing having three contact surfaces carded thereon configured to engage the motor vehicle at three triangularly disposed points;

each of said base members including a flexible strap configured to engage opposite sides of the vehicle to provide lateral support to said base member when said base member is in place on the motor vehicle;

an article-engaging member carded on each of said base members for engaging the elongate members to be carded on the motor vehicle; and a tensioning system for tensioning each said flexible straps, said tensioning system comprising:

an elongate tensioning member having a pair of laterally displaced substantially parallel cooperating cross members around and between which said flexible strap is threaded and further including an extended portion by means of which the tensioning member can be rotated to a tensioned position to shorten the effective length of said strap and thereby increase the tension in said strap; and a retainer detachably coupled to the tensioning member for securing the tensioning member in the tensioned position.

* * * * *